Figure 1:
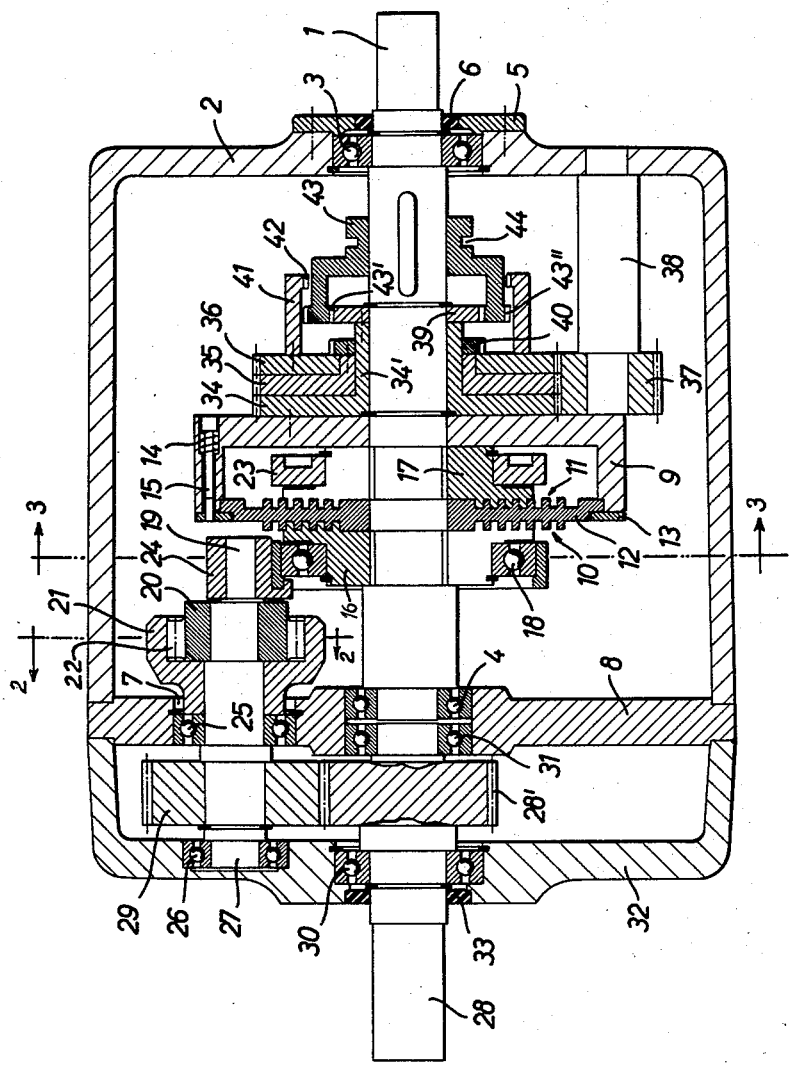

March 2, 1965 F. RIEDL 3,171,289
CONTROL MECHANISM FOR INFINITELY VARIABLE GEAR
Filed June 8, 1962 2 Sheets-Sheet 1

INVENTOR
FRANZ RIEDL
BY Dicke + Craig
ATTORNEYS

March 2, 1965  F. RIEDL  3,171,289
CONTROL MECHANISM FOR INFINITELY VARIABLE GEAR
Filed June 8, 1962  2 Sheets-Sheet 2

INVENTOR.
FRANZ RIEDL
BY Dicker + Craig
ATTORNEYS

United States Patent Office 3,171,289
Patented Mar. 2, 1965

3,171,289
CONTROL MECHANISM FOR INFINITELY VARIABLE GEAR
Franz Riedl, Hauptstrasse 78, Sinningen, near Biberach, Germany
Filed June 8, 1962, Ser. No. 201,113
Claims priority, application Germany, June 9, 1961, R 30,500
7 Claims. (Cl. 74—117)

The present invention relates to a control mechanism for an infinitely variable gear, especially for a motor vehicle, which comprises a pair of circular plates or the like which are rotatable with the drive shaft and are adjustable vertically thereto in opposite directions to each other by means of a disk which has a plane self-locking worm thread on each side thereof in threaded engagement with the plates, and in which one of the plates is adapted to control the oscillatable member of free-wheel clutches or ratchet drive mechanisms for rotating the driven shaft, while the other plate serves as a counterweight for the first plate, and which further comprises means for varying the speed of rotation of the worm-threaded disk so as to be equal to or lower or higher than the speed of the drive shaft.

It is one particular object of the present invention to provide a control mechanism of the above-mentioned type which may be controlled entirely independently of the torque which is to be transmitted by the infinitely variable gear.

For attaining the last-mentioned object the present invention employs a control mechanism of the type as above described in which the means for varying the speed of rotation of the worm-threaded disk relative to the speed of the drive shaft are provided in the form of three gear wheels which are freely rotatable on the drive shaft and have equal pitch diameters but different numbers of teeth and are all in engagement with each other by meshing with a pinion which is rotatably mounted on a shaft which is secured to the gear housing. One of these gear wheels is secured to the worm-threaded disk or to a part carrying the same, and this gear is provided with a hub which serves as a bearing for the two other gear wheels. The invention further provides that each of these clutch wheels is secured to a gear ring or the like, each of which is adapted to be alternately engaged with a coupling sleeve with internal and external clutch teeth thereon which is rotatable with the drive shaft and axially slidable thereon to effect such alternate engagement between the drive shaft and the clutch rings. The clutch ring on the gear wheel which is secured to the worm-threaded disk is preferably disposed between the clutch rings which are secured to the two other gear wheels, and the external teeth of two of the clutch rings are preferably equal to the internal teeth on the coupling sleeve, while the third clutch ring is provided with internal teeth which are equal to the external teeth on the coupling sleeve.

The adjustment and control of the circular plates which are eccentrically adjustable relative to the drive shaft for controlling the operation of the oscillatable parts of freewheel clutches, ratchet gear mechanisms or the like which are connected to the driven shaft and permit the latter to be driven at any desired speed even though the drive shaft might run at a constant speed, may therefore now be effected without requiring any substantial force to be exerted for shifting the coupling sleeve.

Figure 2:
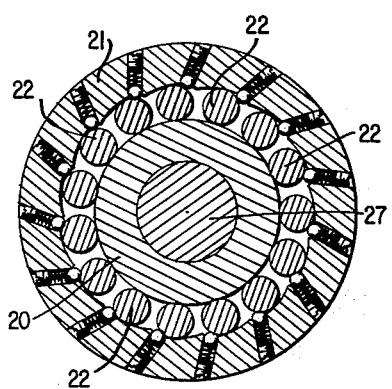
Figure 4:
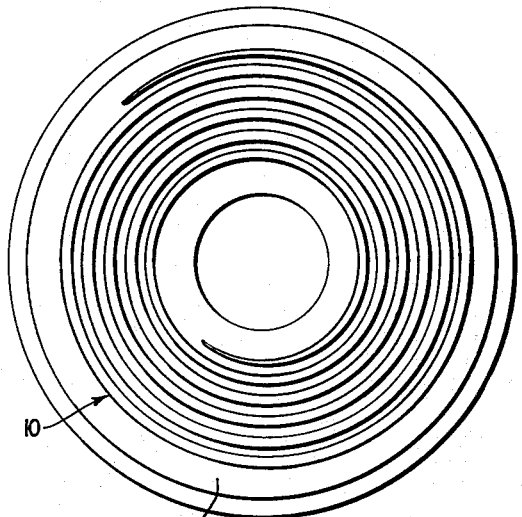
Figure 3:
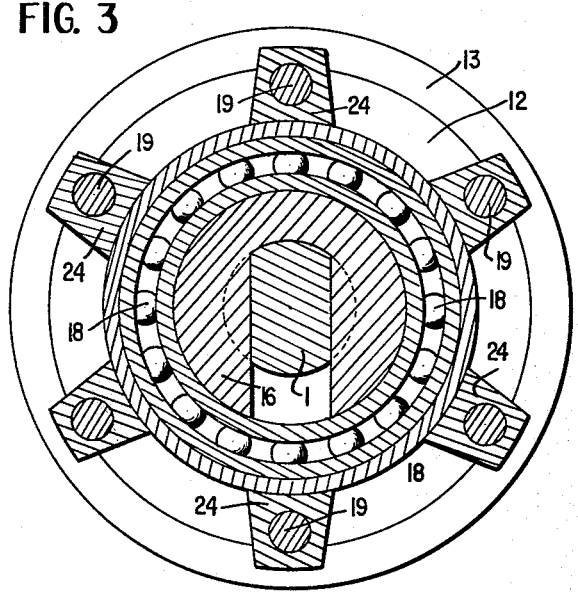
Figure 5:
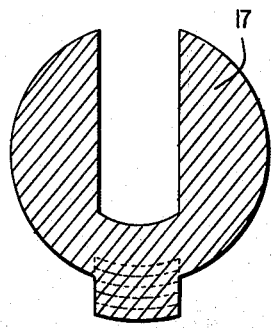
Figure 6:
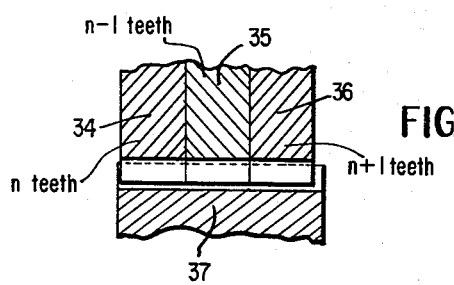

These as well as additional features and advantages of the present invention will become more clearly apparent from the following detailed description thereof which is to be read with reference to the accompanying drawing figures which illustrate diagrammatically a preferred embodiment of the invention as follows:

FIGURE 1 shows a longitudinal section through applicant's gear housing;
FIGURE 2 is an enlarged transverse section taken along line 2—2 of FIGURE 1;
FIGURE 3 is an enlarged transverse section taken along line 3—3 of FIGURE 1;
FIGURE 4 is an enlarged side elevation view of member 12;
FIGURE 5 is an enlarged transverse sectional view of member 17, while
FIGURE 6 is an enlarged fragmentary detailed section showing the meshing relationship of gears 34–37 of FIGURE 1.

In FIGURE 1 of the drawing, the drive shaft 1 of the infinitely variable gear according to the invention is rotatably mounted in the gear housing 2 by means of ball bearings 3 and 4. Bearing 3 is inserted into a bore in the bottom of the cup-shaped housing 2 and is sealed tightly toward the outside by an oil seal ring 6 or the like, while bearing 4 is mounted in a partition 8 which is secured to the housing 2 and provided with a plurality of apertures 7. Drive shaft 1 further has freely rotatable thereon a cup-shaped member 9 which is closed by a flat disk 12 with plane worm threads 10 and 11 cut into each side thereof. This worm-threaded disk 12 is clamped upon the cup-shaped member 9 by a ring 13 which is resiliently secured to the member 9 by tie bolts 15 and springs 14 thereon. This permits the worm-threaded disk 12 to turn relative to the cup-shaped member 9 in the event that an overload occurs, for example, if the torque to be transmitted exceeds a certain adjustable value. The worm thread 10 in the outer side of disk 12 engages with teeth on a circular plate 16, while the worm thread 11 at the inner side of disk 12 engages with teeth on a similar circular plate 17. Since the worm threads 10 and 11 extend in opposite directions to each other, plates 16 and 17 are also slidable in opposite directions when the speed of rotation of disk 12 changes relative to the speed of the drive shaft 1. Both plates 16 and 17 are slidable in the radial direction relative to drive shaft 1 and therefore revolve at the same speed as the drive shaft. Plate 16 acts by means of a ball bearing 18 upon arms 19 of freewheel clutches or the like which are capable of oscillating back and forth and the inner main members of which are indicated at 20, the outer main members at 21, and the grip rollers at 22. Plate 17, on the other hand, serves as the support of a counterweight 23, which counterbalances the eccentricity of plate 16 relative to the drive shaft. When the arms 19 are moved back and forth through segments 24, the inner main members 20 of the clutches also oscillate and thereby, for example, during the forward movement, take along the outer main members 21 so that the shafts 27 which are mounted on roller bearings 25 and 26 are rotated in the same direction. Each shaft 27, only one of which is visible in FIGURE 1, carries a gear 29 which meshes with a gear 28' which is secured to the driven shaft 28. Shaft 28 is rotatably mounted on ball bearings 30 and 31 in the cover 32 of the housing and in the partition 8, respectively. The inside of cover 32 is sealed toward the outside by an oil seal ring 33 or the like. The cup-shaped member 9 has rigidly secured thereto a first gear wheel 34 with external teeth which has a hub 34' which serves as a bearing of two further gear wheels 35 and 36 which likewise have external teeth. The teeth of gear wheels 34, 35, and 36 which have an equal pitch diameter are in mesh with a pinion 37 which is rotatably mounted on a stationary shaft 38 which is secured to the housing 2. Gear wheel 34 which is rotatable on drive shaft 1 and rigidly secured to the cup-shaped member 9 is rigidly secured to clutch ring 39 with external teeth, and gear wheel 35 which is freely rotatable on the hub 34' of clutch wheel 34 is rigidly secured to a gear ring 40 which likewise has external teeth.

while the third gear wheel 36 is secured to a tubular clutch ring 41 which is provided with internal teeth 42. Clutch ring 39 is disposed between clutch ring 40 and the teeth 42 of gear ring 41. Gear rings 39 and 40 have an equal number of teeth which also have an equal pitch diameter.

Drive shaft 1 further carries a cup-shaped coupling sleeve 43 which is splined thereon so as to be rotatable with but slidable axially along the shaft. This coupling sleeve 43 also has on its rim internal clutch teeth 43' and external clutch teeth 43", and it may be moved back and forth along drive shaft 1 by a lever or similar element, not shown, which engages into an annular groove 44 in the hub of the coupling sleeve so that the internal teeth 43' may be alternately engaged with or disengaged from the teeth on clutch ring 39 or those on gear ring 40, while the external teeth 43" on the coupling sleeve 43 may be engaged with or disengaged from the internal teeth 42 on gear ring 41. Teeth 42 have the same number and the same pitch diameter as teeth 43".

The teeth of gear wheels 34, 35, and 36 have an equal pitch diameter, but gear wheel 35 has one tooth less and gear wheel 36 one tooth more than gear wheel 34, or if gear wheel 34 has $n$ teeth, gear wheel 35 has $n-1$ and gear wheel 36 $n+1$ teeth. If therefore gear wheel 34 has, for example, eighty teeth, gear wheel 35 will have seventy-nine and gear wheel 36 eighty-one teeth. Of course, the difference in the number of teeth between these gear wheels may also be greater than one.

The control mechanism according to the invention operates as follows:

Assuming that the coupling sleeve 43 is shifted to a position in which neither its internal teeth 43' nor its external teeth 43" are in engagement with any other teeth, and that the two plates 16 and 17 are located in their central or neutral position in which they are both spaced at the same minimum distance from the axis of drive shaft 1, the latter may rotate, while the driven shaft 28 will be stationary. If the coupling sleeve 43 is then shifted from the last-mentioned position to the position which is illustrated in the drawing, in which its internal teeth 43' mesh with the external teeth on clutch ring 39, disk 12 with its worm threads 10 and 11 will rotate at the same speed as drive shaft 1. Disk 12 will therefore not be turned relative to drive shaft 1, which means that plates 16 and 17 will remain in the same position relative to each other and the driven shaft 28 will still remain stationary.

In order to start the rotation of the driven shaft 28, it is necessary to shift the coupling sleeve 43 so that its external teeth 43" engage with the internal teeth 42 on clutch ring 41. Since gear wheel 36 which is connected to ring 41 has eighty-one teeth, while gear wheel 34 has only eighty teeth, the cup-shaped member 9 and thus also the worm-threaded disk 12 will be turned relative to the drive shaft 1 with the result that plates 16 and 17 will be moved radially outwardly and thereby actuate the freewheel clutches 20, 21, 22, or ratchet drive mechanisms so that the driven shaft 28 will start to rotate. The more the plates 16 and 17 are shifted outwardly, the greater will be the speed of rotation of the driven shaft 28, even though the driving speed of shaft 1 is not increased. As soon as the driven shaft 28 reaches the speed which should be maintained, the coupling sleeve 43 is shifted so that its internal teeth 43' engage with the external teeth on clutch ring 39. The speed of the driven shaft 28 then remains constant, provided that the drive shaft 1 rotates at a constant speed. Consequently, if the speed of drive shaft 1 is then changed, the speed of the driven shaft is also changed accordingly.

If the speed of the driven shaft 28 is to be reduced, the coupling sleeve 43 should be shifted so that its internal teeth 43' engage with the external teeth on clutch ring 40. Since in the present case gear wheel 35 is assumed to have 79 teeth, the speed of the cup-shaped member 9 and thus also the speed of the worm-threaded disk 12 will then be slightly reduced relative to the speed of drive shaft 1 with the result that plates 16 and 17 will move radially inwardly toward the drive shaft 1, that is, toward each other. If the person operating the infinitely variable gear or the automatic control mechanism thereof now leaves the coupling sleeve 43 in the last-mentioned position so that plates 16 and 17 finally abut against the drive shaft, disk 12 will then slip relative to the cup-shaped member 9. The resilient connection between the worm threaded disk 12 and the cup-shaped member 9 therefore serves as a safety coupling.

Of course, it is also possible to employ additional means for insuring that the coupling sleeve 43 will be automatically shifted when plates 16 and 17 reach one on the other end position. Although it is advisable to maintain plates 16 and 17 in the adjusted position by shifting the coupling sleeve 43 into engagement with clutch ring 39, the same effect may also be attained by shifting the coupling sleeve so as to be disengaged from the teeth of all clutch rings. Furthermore, it is advisable to provide suitable means, such as spring-loaded balls or the like, for arresting the coupling sleeve 43 in each of its four different positions so as to prevent it from being shifted accidentally.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. In an infinitely variable gearing having a housing, a drive shaft and a driven shaft rotatably mounted in said housing, means operatively connecting said drive shaft and said driven shaft including clutch means having oscillatable members for driving said driven shaft at different speeds, a disk mounted on said drive shaft so as to be rotatable relative thereto and having plane self-locking worm threads on both sides thereof, a circular plate on each side of said disk and in threaded engagement with said worm threads and mounted on said drive shaft so as to be rotatable with but slidable in a vertical direction relative to said drive shaft and in opposite directions to each other, the first of said plates adapted to be moved in response to rotation of said disc from a neutral position in which said first of said plates is disposed substantially coaxial with said drive shaft and free of torque-transmitting connection with said oscillatable members, to different positions eccentric to said drive shaft, means operative in response to the assumption by said first of said plates of said different positions to establish a torque-transmitting connection between said first of said plates and said oscillatable members, the speed of said driven shaft being adapted to be increased in accordance with the increase in eccentricity of said first plate relative to said drive shaft in response to rotation of said disk, the second plate serving as a counterweight to counterbalance the eccentricity of said first plate, and means for varying the speed of said disk relative to the speed of said drive shaft comprising three gear wheels on and rotatable relative to said drive shaft and having equal pitch diameters but different numbers of teeth, a pinion rotatably mounted on said housing and in mesh with said three gear wheels, one of said gear wheels being secured to said disk, a separate clutch ring secured to each of said gear wheels, and a coupling sleeve having clutch teeth mounted on said drive shaft so as to be rotatable therewith but slidable axially thereon to permit said coupling sleeve to be selectively engaged with either of said clutch rings.

2. In an infinitely variable gearing having a housing, a drive shaft and a driven shaft rotatably mounted in said housing, means operatively connecting said drive shaft and said driven shaft including clutch means having oscillatable members for driving said driven shaft at different speeds, a disk mounted on said drive shaft so as to be rotatable relative thereto and having plane self-locking worm threads on both sides thereof, a circular plate on each side of said disk and in threaded engagement with said worm threads and mounted on said drive shaft so as to be rotatable with but slidable in a vertical direction relative to said drive shaft and in opposite directions to each other, the first of said plates adapted to be moved in response to rotation of said disk from a neutral position in which said first of said plates is disposed substantially coaxial with said drive shaft and free of driving connection with said oscillatable members, to different positions eccentric to said drive shaft, means operative in response to the assumption by said first of said plates of said different positions to establish driving connections between said first of said plates and said oscillatable members, the speed of said driven shaft being adapted to be increased in accordance with the increase in eccentricity of said first plate relative to said drive shaft in response to rotation of said disk, the second plate serving as a counterweight to counterbalance the eccentricity of said first plate, and means for varying the speed of said disk relative to the speed of said drive shaft comprising three gear wheels on and rotatable relative to said drive shaft and having equal pitch diameters but different numbers of teeth, a pinion rotatably mounted on said housing and in mesh with said three gear wheels, a separate gear ring secured to each of said clutch wheels, one of said gear wheels being secured to said disk and its associated clutch ring thereon being disposed between the two other clutch rings, and a coupling sleeve having external and internal clutch teeth mounted on said drive shaft so as to be rotatable therewith but slidable axially thereon, two of said clutch rings having external teeth equal to and either of them adapted to be selectively engaged with said internal teeth of said coupling sleeve, and the third clutch ring having internal teeth equal to and adapted to be selectively engaged with said external teeth of said coupling sleeve, and means for shifting said coupling sleeve to effect such a selective engagement.

3. In an infinitely variable gearing having a housing, a drive shaft and a driven shaft rotatably mounted in said housing, means operatively connecting said drive shaft and said driven shaft including clutch means having oscillatable members for driving said driven shaft at different speeds, a disk mounted on said drive shaft so as to be rotatable relative thereto and having plane self-locking worm threads on both sides thereof, a circular plate on each side of said disk and in threaded engagement with said worm threads and mounted on said drive shaft so as to be rotatable with but slidable in a vertical direction relative to said drive shaft and in opposite directions to each other, the first of said plates adapted to be moved in response to rotation of said disk from a neutral position in which said first of said plates is disposed substantially coaxial with said drive shaft and free of driving connection with said oscillatable members, to different positions eccentric to said drive shaft, means operative in response to the assumption by said first of said plates of said different positions to establish driving connections between said first of said plates and said oscillatable members, the speed of said driven shaft being adapted to be increased in accordance with the increase in eccentricity of said first plate relative to said drive shaft in response to rotation of said disk, the second plate serving as a counterweight to counterbalance the eccentricity of said first plate, and means for varying the speed of said disk relative to the speed of said drive shaft comprising three gear wheels closely adjacent to each other having equal pitch diameters but different numbers of teeth, one of said gear wheels being secured to said disk and having a hub mounted on and rotatable relative to said drive shaft, the second gear wheel also having a hub rotatably mounted on the hub of said first gear wheel, and the third gear wheel being rotatably mounted on the hub of said second gear wheel, a pinion rotatably mounted on said housing and in mesh with said three gear wheels, a separate clutch ring secured to each of said gear wheels, and a coupling sleeve having clutch teeth mounted on said drive shaft so as to be rotatable therewith but slidable axially thereon to permit said coupling sleeve to be selectively engaged with each of said clutch rings.

4. In an infinitely variable gearing having a housing, a drive shaft and a driven shaft rotatably mounted in said housing, means operatively connecting said drive shaft and said driven shaft including clutch means having oscillatable members for driving said driven shaft at different speeds, a disk mounted on said drive shaft so as to be rotatable relative thereto and having plane self-locking worm threads on both sides thereof, a circular plate on each side of said disk and in threaded engagement with said worm threads and mounted on said drive shaft so as to be rotatable with but slidable in a vertical direction relative to said drive shaft and in opposite directions to each other, rotatable means connecting the first of said plates to said oscillatable members, said first of said plates adapted to be moved, upon rotation of said disk from a neutral position in which said first of said plates is disposed substantially coaxially with said drive shaft and free of torque-transmitting connection to said rotatable means and to said oscillatable members, said first of said plates being moved upon rotation of said disk, to different positions eccentric to said drive shaft in which different positions said rotatable means are driven by said first of said plates, said rotatable means being effective to drive said oscillatable members, the speed of said driven shaft being adapted to be increased in accordance with the increase in eccentricity of said first plate relative to said drive shaft in response to rotation of said disk, the second plate serving as a counterweight to counterbalance the eccentricity of said first plate, and means for varying the speed of said disk relative to the speed of said drive shaft comprising three gear wheels closely adjacent to each other, connecting means for drivably connecting one of said gear wheels and said disk, said one of said gear wheels having a hub mounted on and rotatable relative to said shaft, the second gear wheel also having a hub rotatably mounted on the hub of said first gear wheel, and the third gear wheel being rotatably mounted on the hub of said second gear wheel, a pinion rotatably mounted on said housing and in mesh with said three gear wheels, separate gear rims of the same diameter secured to the free end of the hubs of said first and second gear wheels and having equal external teeth, and a clutch ring secured to the third gear wheel and having internal teeth, and a coupling sleeve mounted on said drive shaft so as to be rotatable therewith but slidable axially thereon and having internal and external gear teeth, said coupling sleeve when being shifted on said drive shaft being adapted selectively to engage its internal teeth with the teeth on either of the clutch rings on said first and second gear wheels and its external teeth with the teeth on said clutch ring on said third gear wheel.

5. In an infinitely variable gearing having a housing, a drive shaft and a driven shaft rotatably mounted in said housing, means operatively connecting said drive shaft and said driven shaft including a clutch means having oscillatable members for driving said driven shaft at different speeds, a cup-shaped member mounted on said drive shaft so as to be rotatable relative thereto, a disk forming a cover of said cup-shaped member, adjustable friction means for securing said disk to said cup-shaped member and permitting said disk and said member to turn relative to each other when upon one of them an excessive torque is applied, said disk having plane self-locking worm threads on both sides thereof, a circular plate on the outer side of said disk and a circular plate on the inner side of said disk within said cup-shaped member, both of said plates being in threaded engagement with said worm threads and mounted on said drive shaft so as to be rotatable with but slidable in a vertical direction relative to said drive shaft and in opposite directions to each other, said outer plate adapted to be moved in response to rotation of said disk from a neutral position, in which it is disposed substantially coaxial with said drive shaft and free of torque-transmitting connection to said oscillatable members, to different positions eccentric to said drive shaft, means operative in response to the assumption by said outer plate of said different positions to establish a torque-transmitting connection between said outer plate and said oscillatable members, the speed of said driven shaft being adapted to be increased in accordance with the eccentricity of said first plate relative to said drive shaft, the inner plate serving as a counterweight to counterbalance the eccentricity of said first plate, and means for varying the speed of said disk relative to the speed of said drive shaft comprising three gear wheels on and rotatable relative to said drive shaft and having equal pitch diameters but different numbers of teeth, a pinion rotatably mounted on said housing and in mesh with said three gear wheels, one of said gear wheels being secured to said cup-shaped member, a separate clutch ring secured to each of said gear wheels, and a coupling sleeve having clutch teeth mounted on said drive shaft so as to be rotatable therewith but slidable axially thereon to permit said coupling sleeve to be selectively engaged with either of said clutch rings.

6. In an infinitely variable gearing having a drive shaft and a driven shaft, means drivably connecting said drive shaft with said driven shaft comprising free-wheel clutches disposed eccentrically with respect to said drive and driven shafts, each of said clutches having concentric outer and inner components, one of said inner and outer components of each of said clutches being drivably connected to said driven shaft by means including gear means, the other of said inner and outer components of each of said clutches being provided with an eccentrically mounted arm, three rotatable members supported on said drive shaft and operably connected to said arm, two of said rotatable members being mounted on said drive shaft for movement rotatable therewith and for radially slidable movement relative thereto in opposite directions, the other of said three rotatable members being rotatable relative to said drive shaft and comprising a disk, the opposite sides of said disk being provided with threads, said two of said rotatable members comprising plate members carrying thread means respectively engaged by said threads on said opposite sides of said disk for effecting said radially slidable movement upon rotation of said disk, means including gear members for rotating said disk by said drive shaft, means establishing a torque-transmitting connection between one of said plate members and said eccentrically mounted arm of each of said other of said inner and outer components, the other of said plate members carrying a counterweight member and serving as a counterbalance for said one of said plate members during said radially slidable movement.

7. In an infinitely variable gearing according to claim 6, wherein said gear members included in said means for rotating said disk comprise three toothed gear wheels rotatably supported by said drive shaft and having identical pitch diameters but different numbers of teeth, a pinion in mesh with said three gear wheels, means yieldably connecting one of said three gear wheels with said disk, a toothed clutch member connected to each of said three gear wheels, and toothed clutch means slidably and non-rotatably mounted on said drive shaft for engagement with a selected one of said toothed clutch members.

References Cited in the file of this patent
UNITED STATES PATENTS

| | | |
|---|---|---|
| 2,005,227 | Johnson | June 18, 1935 |
| 2,142,976 | Seidel | Jan. 3, 1939 |
| 2,653,491 | Creber | Sept. 29, 1953 |
| 2,826,928 | Kearns | Mar. 18, 1958 |
| 2,983,154 | Neukirch | May 9, 1961 |